US010261849B1

(12) United States Patent
Burke et al.

(10) Patent No.: US 10,261,849 B1
(45) Date of Patent: Apr. 16, 2019

(54) PREVENTATIVE REMEDIATION OF SERVICES

(71) Applicant: Electronic Arts Inc., Redwood City, CA (US)

(72) Inventors: Maximilian Louis Burke, Coquitlam (CA); Oswaldo Carlos Caballero, III, Menlo Park, CA (US)

(73) Assignee: ELECTRONICS ARTS INC., Redwood City, CA (US)

( * ) Notice: Subject to any disclaimer, the term of this patent is extended or adjusted under 35 U.S.C. 154(b) by 85 days.

(21) Appl. No.: 15/675,624

(22) Filed: Aug. 11, 2017

(51) Int. Cl.
| *G06F 11/00* | (2006.01) |
| *G06F 11/07* | (2006.01) |
| *G06N 3/04* | (2006.01) |
| *G06K 9/34* | (2006.01) |
| *G06K 9/00* | (2006.01) |
| *G06K 9/62* | (2006.01) |
| *A63F 13/35* | (2014.01) |
| *G06K 9/03* | (2006.01) |

(52) U.S. Cl.
CPC .......... *G06F 11/0754* (2013.01); *A63F 13/35* (2014.09); *G06F 11/0709* (2013.01); *G06F 11/0793* (2013.01); *G06K 9/00973* (2013.01); *G06K 9/03* (2013.01); *G06K 9/344* (2013.01); *G06K 9/6256* (2013.01); *G06N 3/04* (2013.01); *G06K 2209/01* (2013.01)

(58) Field of Classification Search
CPC ............. G06F 11/0754; G06F 11/0709; G06F 11/0793; A63F 13/35; G06K 9/00973; G06K 9/03; G06K 9/344; G06K 9/6256; G06K 2209/01; G06N 3/04
See application file for complete search history.

(56) References Cited

U.S. PATENT DOCUMENTS

| 5,463,768 | A * | 10/1995 | Cuddihy | ............. G06F 11/2205 714/37 |
| 6,343,236 | B1 * | 1/2002 | Gibson | ................... B61C 17/04 700/110 |
| 6,598,179 | B1 * | 7/2003 | Chirashnya | ........... G06F 11/079 714/19 |
| 6,782,345 | B1 * | 8/2004 | Siegel | ................. G06F 11/0733 399/18 |
| 7,213,176 | B2 * | 5/2007 | Banko | ................... G06F 11/079 714/38.12 |
| 2011/0239032 | A1 * | 9/2011 | Kato | ....................... G06F 17/15 713/500 |

* cited by examiner

*Primary Examiner* — Jason B Bryan
(74) *Attorney, Agent, or Firm* — McDermott Will & Emery LLP

(57) ABSTRACT

A remediation server utilizing a deep neural network to analyze a live service to predict when a service is about to experience a failure and determine the least intrusive method of remediation. The remediation server prioritizing maintaining the highest level of system availability when determining a remediation for a failed or failing service.

20 Claims, 12 Drawing Sheets

Status Code Images

FIG. 3A

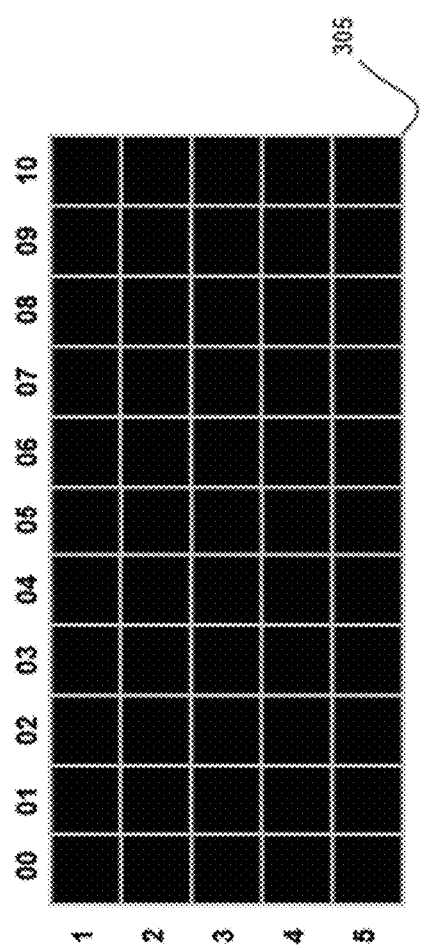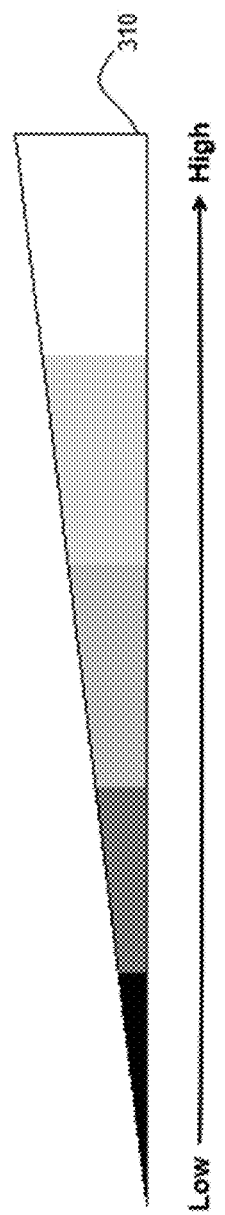
FIG. 3B Status Code Image
FIG. 3C Greyscale Frequency Chart

Generated Status Code Image

Remediation Process

Status Code Feature Map Normalization

Status Code Feature Map Pooling

Fully Connected Layer

US 10,261,849 B1

PREVENTATIVE REMEDIATION OF SERVICES

BACKGROUND

Modern video game infrastructures rely upon a variety of services to keep players connected to their games, social networks, and streaming services. Currently remediation processes for software infrastructures do not enable a service to maintain continuous operative availability, which can degrade a player's gameplay experience with prolonged waiting periods.

SUMMARY

An operative log of the service is a text file containing operative service codes in a fixed location; wherein the operative status codes are conventional hypertext transfer protocol status codes. A remediation server is configured with the location of operative status codes within the operative log to omit scanning the remainder of the operative log. The remediation server is also configured to scan the remainder of the operative log for additional operative metrics of the service. An image scan of the operative log is performed character by character using character text filters; wherein the character text filters comprise a pixel size equivalent to the scanned status code character, such that the remediation server performs a one-to-one pixel comparison for identifying a potential service failure. A current service failure may also be identified when scanning the operative log. The filtering of the status code image by a convolutional neural network utilizes remediation filters, wherein the remediation filters are image based convolution kernels with a pixel bit value equal to that of the generated status code image. The remediation filters include a scalar value equivalent the reciprocal value of the maximum bit value of the generated status code, the inclusion of the scalar to remediation filters enabling the convolution neural network to omit applying weights to the inputs of the convolution neural network. Omitting scanning the remainder of the operative log and omitting applying weights to the inputs of the convolution neural network contribute to a reduction of the time to remediate a service.

BRIEF DESCRIPTION OF THE DRAWINGS

The present disclosure is illustrated by way of example, and not by way of limitation, and can be more fully understood with reference to the following detailed description when considered in connection with the figures.

FIG. 3A illustrates various embodiments of a status code image.

FIG. 3B illustrates a greyscale status code image format.

FIG. 3C depicts a greyscale gradient chart.

DETAILED DESCRIPTION

Figure 1:
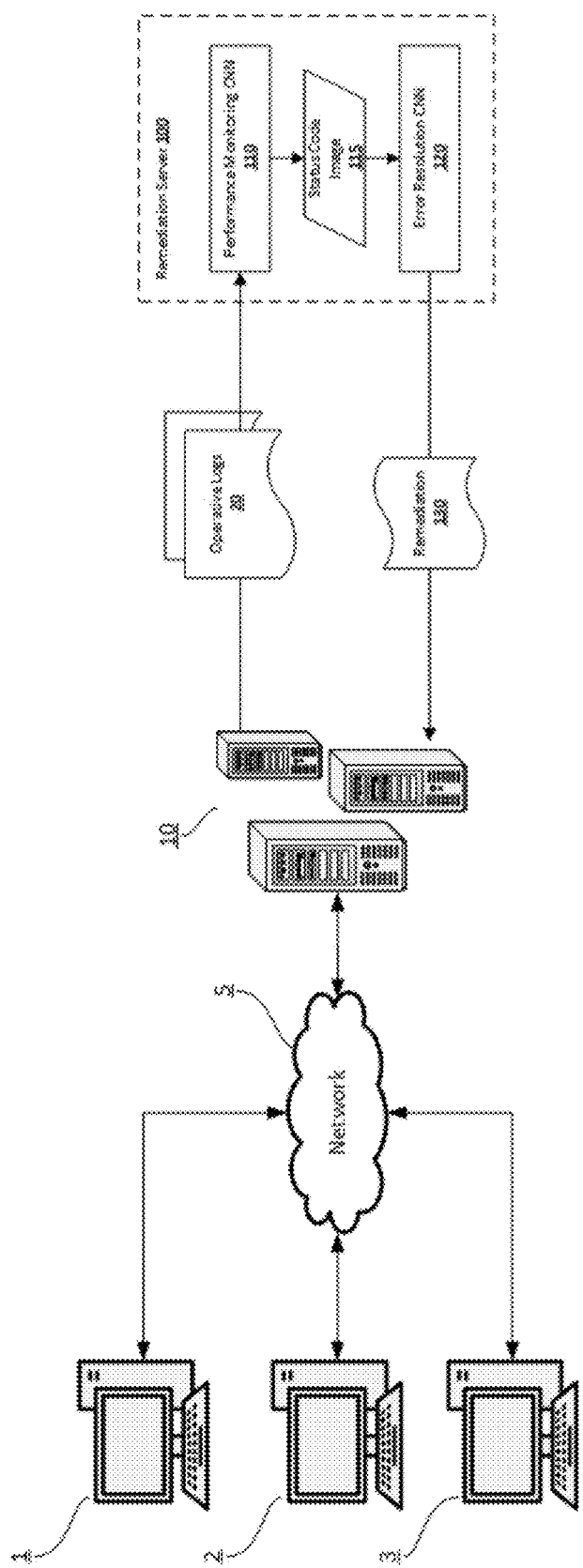
FIG. 1 illustrates an infrastructure for automated service remediation.

Common service remediation techniques often monitor inventory and health and invoke a simple routine when a service failure occurs. A simple routine may include a hard restart of a server or the allocation of excessive operative loads to reserve servers. In practice, service failures often persist after simple routines have been applied, which prolongs the downtime of a service. Extended periods of downtime can leave a service connected software environment to become unresponsive or unusable to a user. An example of a service connected software environment is a video game, where the execution of a video game may include calls to one more external services. The disclosed system addresses a problem in traditional localization systems tied to computer technology and arising in the realm of computer networks, namely the technical problem of a service experiencing downtime during the failure of service.

A service can be configured to periodically produce operative logs (e.g., a text file containing operative information of the service such as performance metrics and data) which can aid in the identification of the cause(s) of a service failure. One common practice for identifying causes of service failures is manual inspection (e.g., human inspection) of operative logs. However, with the growing demand of service connectivity in video game infrastructures, manual inspection of operative logs has become an inefficient solution as it cannot reduce or eliminate the downtime of service.

Deep neural network learning techniques, such as convolutional neural networks, enable computing devices to observe, learn, and respond to a variety of input data (e.g., image, video, and audio streams and feeds, and the like) such that a computing device develops the ability identify objects, behaviors, words, patterns, or rules in an observed medium. The results and information of which can be back propagated into the neural network to improve deterministic logic for selecting the most appropriate, efficient, and effective response. Such convolutional neural networks can be applied to automate the remediation of a service.

The disclosed system solves this technical problem by providing a solution also rooted in computer technology, namely, by utilizing one or more convolution neural networks (referenced herein as "CNNs" or as a "CNN") trained on error conditions to intrinsically predict and remediate service failures prior to their occurrence. In addition, the solution provided by the disclosed system can also be used to reduce the downtime of a service that has failed.

In some aspects, a remediation server contains a performance monitoring CNN dedicated to monitoring the operative logs of a service to identify various operative metrics (e.g., HTTP server status codes, operative load, available bandwidth, client connections, message requests, and the like) and generating a status code image. A status code image is an illustrative representation of the operative metrics of a service. In some embodiments, the status code image is dynamic and persistent, such that the illustration is updated as the performance monitoring CNN measures the performance metrics in a service. Additionally, the performance monitoring CNN may save iterations and variations of a status code image over time. In one embodiment, a remediation server also includes an error resolution CNN. The error resolution CNN is configured to scan and filter a status code imagine for determining the most suitable remediation of a predicted or occurring failure of a service. The disclosed system further provides improvements to the functioning of the computer itself because it saves data storage space, reduces system loading times and reduces the cost of system resources.

System Overview

Embodiments of the present disclosure provide for methods and systems for enabling a remediation server to predict and remediate service failures.

FIG. 1 illustrates an infrastructure for automated service remediation in accordance with one embodiment of the present disclosure. The figure includes client devices (items 1, 2, 3), a computing network 5, a group of services 10, operative logs 20, a remediation server 100, a performance monitoring convolutional neural network 110, a status code image 115, an error resolution convolutional neural network 120, and a remediation 130.

In some aspects, a video game infrastructure includes client devices (items 1, 2, 3) connected to a network 5 in communication with a group of services 10 associated with a video game. One or more services from the group of services 10 may send operative logs 20 to a remediation server 100. The operative logs 20 from the group of services 10 include operative metrics of the current state of one or more services from the group of services 10. In one embodiment, the operative logs 20 can be sent from the services 10 periodically to the remediation server 100. Alternatively, the operative logs 20 of the service 10 can be configured to be sent at each operative function or operative code. Additionally, the remediation server 100 may also be configured to request and fetch operative logs 20 from a service.

The remediation server 100 includes a performance monitoring CNN 110 configured to scan the operative logs 20 of the services 10. In some implementations, the performance monitoring CNN 110 utilizes image recognition techniques to detect character text in operative logs 20. In one embodiment, the performance monitoring CNN 110 can be configured to scan operative logs at the location of HTTP server codes. Additionally, the performance monitoring CNN 110 may scan other areas of the operative log if, and when, additional operative data is required for the determination of a remediation.

The generated output of the performance monitoring CNN 110 is a status code image 115, an image file (e.g., GIF, JPEG, PNG, BMP, and the like) representative of the current state of a service through the visual illustration of the HTTP status codes in its respective operative log. Alternatively, a status code image 115 may be representative of the current state of more than one service, such that it illustrates the HTTP status codes of more than one service. In some aspects, a status code image 115 can illustrate any number of the operative metrics of one or more operative logs.

The remediation server 100 also includes an error resolution CNN 120 in operative communication with the performance monitoring CNN 110. The error resolution CNN 120 is configured to receive a status code image 115 from the performance monitoring CNN 110. The error resolution CNN 120 applies one or more remediation filters and deep stack processing (e.g., additional filtering, pooling, and rectified layer units) to the status code image 115 for determining a remediation 130 of a predicted or detected service failure. The determined remediation 130 of the error resolution CNN 120 can be back propagated (e.g., to the remediation server 100 or the error resolution CNN 120) to more efficiently determine remediations of similar failures, blacklist the remediation 130 (e.g., remove from being a possible remediation) if unsuccessful, or to determine new remediation filters.

To simplify discussion and not limit to the present disclosure, a single service in operative communication with a single remediation server comprising two CNN's to generate a remediation is used by way of example. Operative logs 20 including HTTP server status codes are illustrated by way of example, however, any status code method, either conventional or unique in form, may be used to indicate the operative status of service. The client devices (items 1, 2, 3) in FIG. 1 may be any combination of mobile devices, video game consoles, personal computers, set top boxes, or any device of the like capable of enabling a user to access a service connected environment, such as playing a video game through either, or combination of, local or server side rendering methods. Additionally, a status code image 115 need not be limited to raster image formats, it can be any computer-generated illustration, such as vector image or graphical model, that depicts the current state of one or more services by visualizing operative metrics.

Operative Log Scanning

Figure 2:
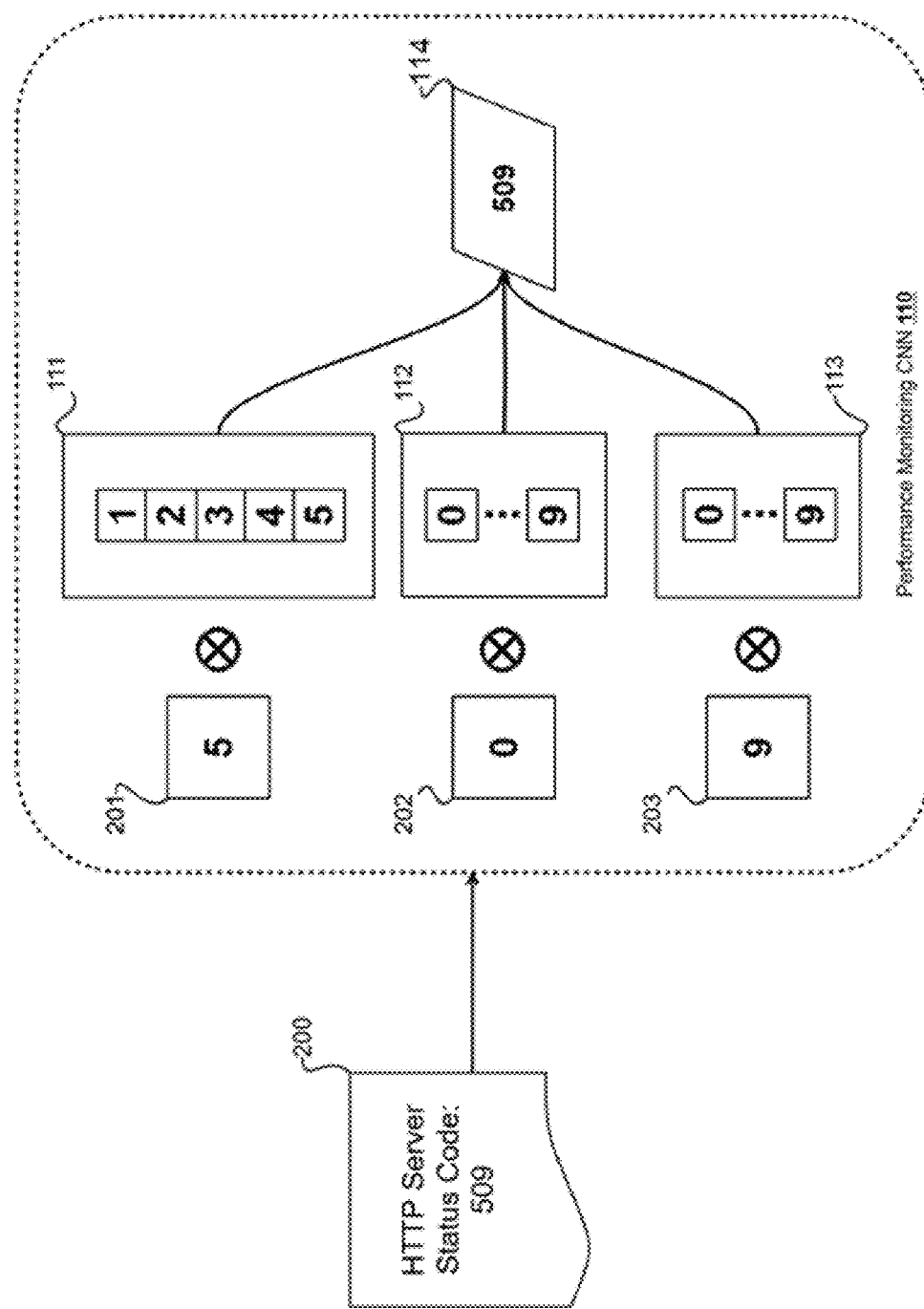
FIG. 2 illustrates an embodiment of character text scanning occurring within a performance monitoring convolutional neural network.

FIG. 2 illustrates an example of character text scanning occurring within a performance monitoring convolutional neural network, including an operative log 200, a performance monitoring CNN 110, scanned images of character text (items 201, 202, 203), character text filters (items 111, 112, 113) and a determined status code 114.

An operative log 200 containing the HTTP status code "509" is sent to the performance monitoring CNN 110. The performance monitoring CNN 110 scans the HTTP server status code within the operative log 200 character by character, as an image. In some aspects, the performance monitoring CNN 110 utilizes a set of character text filters 111 (e.g., convolution kernels) to identify, by way of convolution, a scanned character. In some implementations, the character text filters 111 are the same resolution of a scanned character, such that a one-to-one pixel comparison can be performed between the character text filters 111 and a scanned character to accurately and efficiently identify a scanned character in a single convolution process (e.g., a single filter).

The first scanned character 201 is determined to be a "5", the second character 202 is filtered with a second set of character filters 112 and is determined to be a "0". Finally, the third scanned character 203 is filtered by a third set of character filters and is determined to be a "9", resulting in the status code 115 to be determined. Conventional service failures in HTTP status codes begin with a "5", thus, if identified, the performance monitoring CNN 110 can invoke the error resolution CNN 120 to begin determining a remediation. In some aspects, a performance monitoring CNN 110 is preconfigured with the locations of the HTTP server status codes within the operative logs 20. By utilizing preconfigured locations, the performance monitoring CNN 110 can omit unnecessary location determination, which reduces the time to detect service failures. Additionally, the performance monitoring CNN 110 can also be configured to locate operative metrics within operative logs 20 for such instances of working with an unknown format or requiring additional metrics to determine a more appropriate remediation.

Status Code Image

Figure 3A:
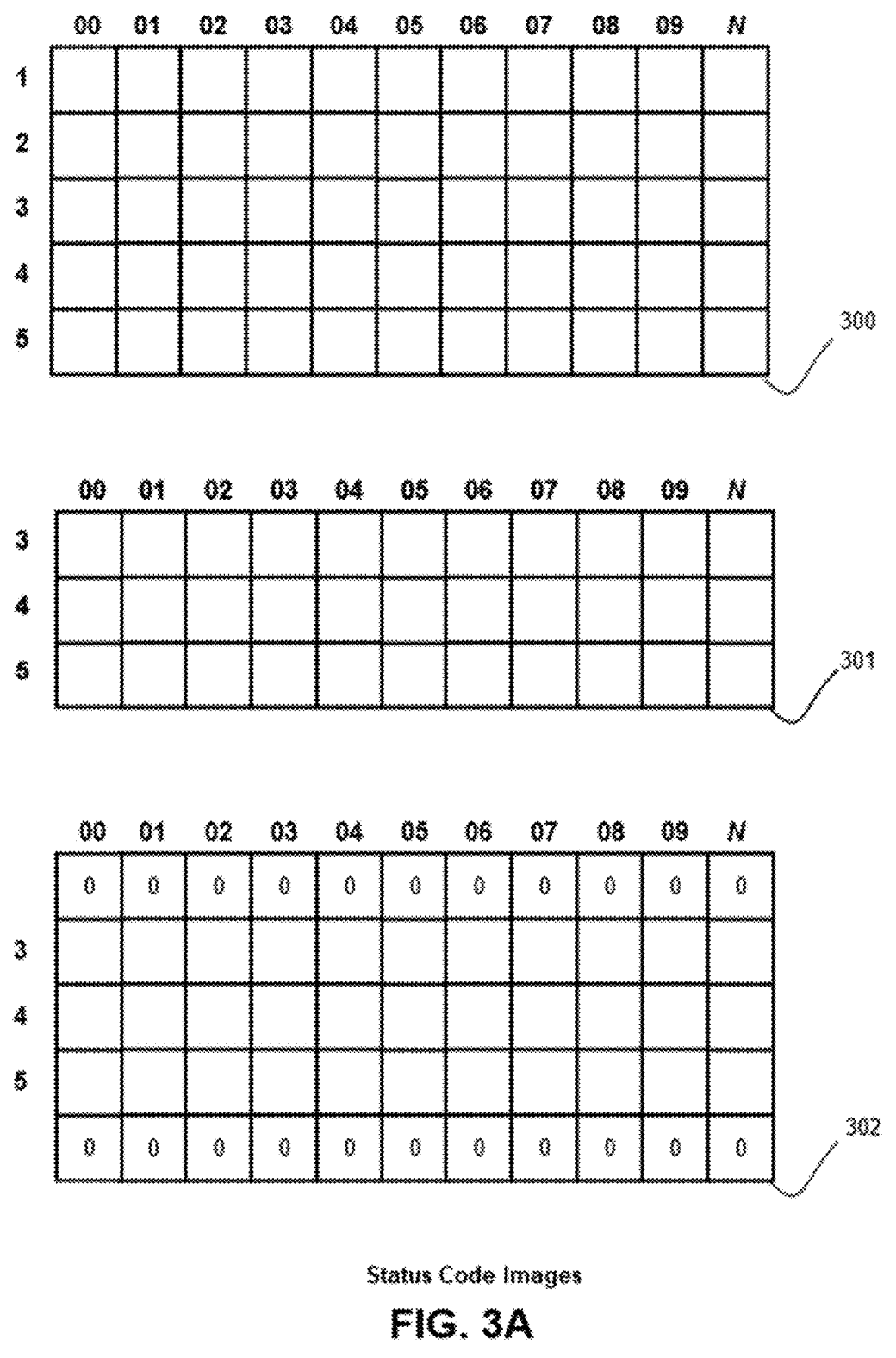

FIG. 3A illustrates various embodiments of a status code image. FIG. 3A includes a 5×N status code image 300, a 3×N status code image 301, and a zero padded 3×N status code image 302.

Upon the recognition of a HTTP server status code, the performance monitoring CNN 110 within the remediation server 100 records the occurrence of the HTTP status codes within an image. By generating an image representative status code occurrences, the remediation server 100 can perform image based convolution for determining a remediation of an occurring or predicted failure in a service. In some embodiments, the remediation server 100 is configured to generate various types status code images and includes logic for determining which status code image type to utilize.

In some aspects, a status code image is an array of pixels containing rows that indicate the first number of an HTTP server status code and columns that indicate the remaining two numbers of an HTTP server status code. Ins, a status code image 300 is a 5×N pixel array, where "N" is a definable arbitrary number. Status code image 300 illustrates an image with the capacity to illustrate HTTP status codes within the "100" to "500" status code categories.

In some embodiments, the status code image need not be limited to a 5×N pixel array, any sized pixel array may be used to satisfy the requirements of a configuration of a system. For example, in one embodiment, a smaller status code image format 301 contains a 3×N pixel array, which contains the capacity to illustrate HTTP server codes between the 300 and 500 status code categories. Although smaller in size, status code image 301 can illustrate key HTTP status codes for failure detection.

In some embodiments, a zero padded status code image format 302 containing a 3×N pixel array may also be utilized. The padded status code image format 302 illustrates key HTTP status codes, but also includes an upper and lower row of zero values in the pixel array, commonly known as "padding" or "zero padding". The padding enables a padded status code image to illustrate key status code categories while being filtered with a larger remediation filter, commonly known as a "kernel" or "convolution kernel".

FIG. 3B illustrates an 8-bit greyscale status code image 300. The status code image 305 may be any bit color length (e.g., 4-bit, 8-bit, and the like). Using a single grey scale image is advantageous in that it reduces the deep stack operations within the neural network (such as filtering, rectifying, pooling).

FIG. 3C illustrates a greyscale gradient chart 310. A greyscale gradient chart 310 can be used to indicate the frequency (e.g., number of occurrences) of each HTTP server status code scanned. In some aspects, as the frequency (e.g., number of occurrences) of HTTP status codes increase, the respective pixel becomes brighter in color (e.g., from black to white). In some embodiments, various colors can also be used within the color gradient chart 301 to represent a greater and more accurate representation of the frequency of HTTP server status code occurrences.

To simplify discussion and not limit to the present disclosure, a status code image 300 is illustrated a grid comprising rows and columns, however, any generated image may be rendered; including, but not limited to, two dimensional and three-dimensional images comprising graphs, charts, objects, shapes, and the like. Additionally, a status code image 300 may comprise a series of images, each of which may be indicative of the operative state of a service 10 at different periods of time.

Figure 4A:
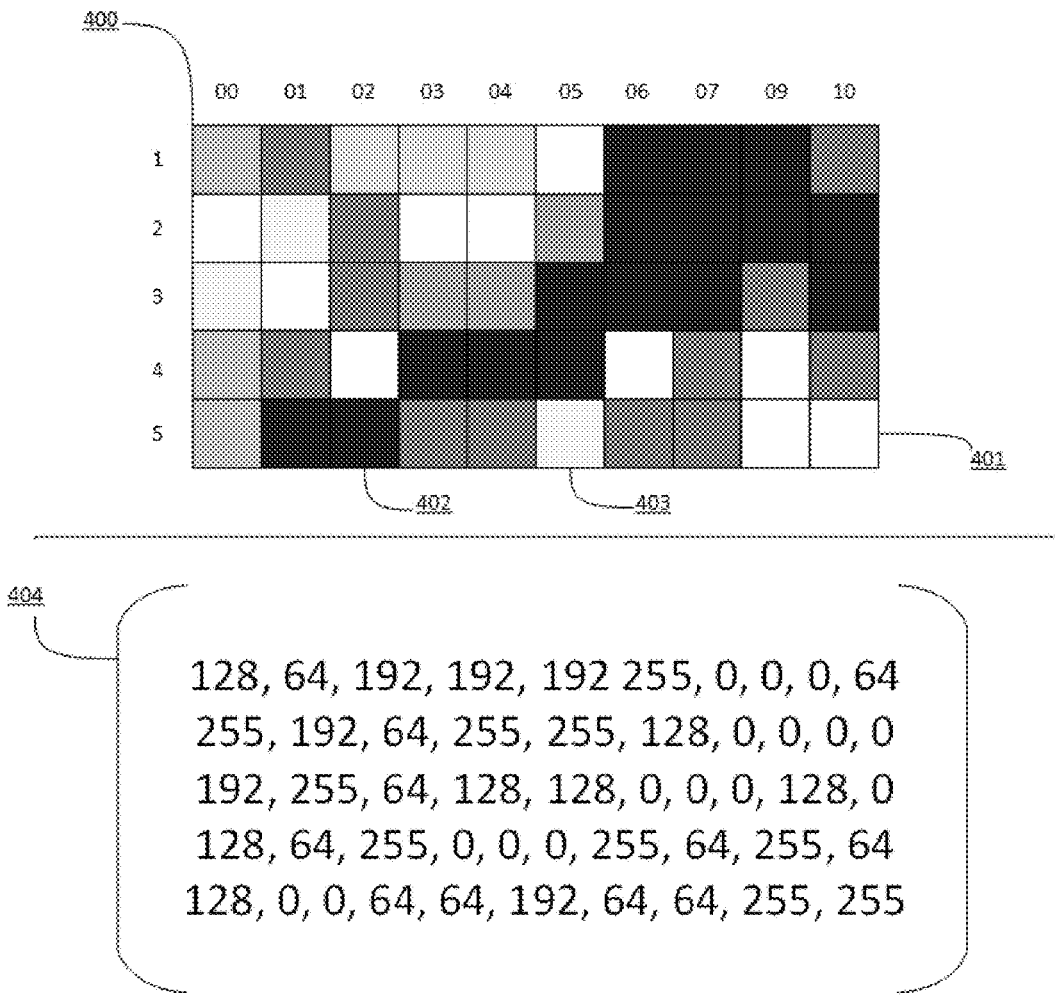
FIG. 4A illustrates an embodiment of generated greyscale status code image.

FIG. 4A illustrates an embodiment of generated greyscale status code image. FIG. 4 includes a generated status code image 400 containing a dark pixel value 402, a grey pixel value 403, and a white pixel value 401, additionally, an array of pixel values 404 for the generated status code image 400 is included.

In one embodiment, the generated status code image 400 is a non-signed 8-bit greyscale image representing the operative state of a service, as determined by the performance monitoring CNN 110 of the remediation server 100. The generated status code image 400 illustrates high and low occurrences of various HTTP status codes. For example, the "502" service code is has not occurred, leaving the respective pixel (item 402) black. The service code "510" has a high occurrence in the operative log, thus the respective pixel (item 401) is a bright white color. As depicted in the gradient chart 310, the remainder of the occurrences may be illustrated as different shades of grey, with high occurrences being lighter, such as with service code "505", illustrated as a light grey pixel (item 403).

To further illustrate the interpreted pixel values, item 404 illustrates an array of pixel values corresponding to the generated status code image 400. In some embodiments, the values are between the non-signed 8 bit values of 0 and 255, however, other implementations of status code images may utilize a different bit color length or image format (e.g., RGB), resulting in a different sized pixel value array.

Remediation Filter

In some aspects, remediation filters correspond to one or more remediation instructions for a service. For example, a sequence of remediation instructions can be to delete temporary files prior to restarting a server, as this can ensure the service will not reference those temporary files after the restart. In some aspects, the sequence of remediation instructions can be determined by error conditioning (e.g., neural network training) of the remediation server 100, where the least intrusive remediation is chosen to be associate with a remediation filter.

In some embodiments, intrusivity is a measure of the impact of a remediation on total system availability. The least intrusive measure may be a method (e.g., remediation instructions) that is fastest to return a troubled service to availability. In some embodiments, the least intrusive may be a method that involves a piecemeal remediation, such restarting services one at a time in a cluster and validating the restarted service works (e.g., is operatively available for use) before restarting the next service in the cluster. In some aspects, the remediation server 100 may improve its error conditioning through back propagation of previously determined and applied remediations, in conjunction with any predefined error conditioning.

Figure 4B:
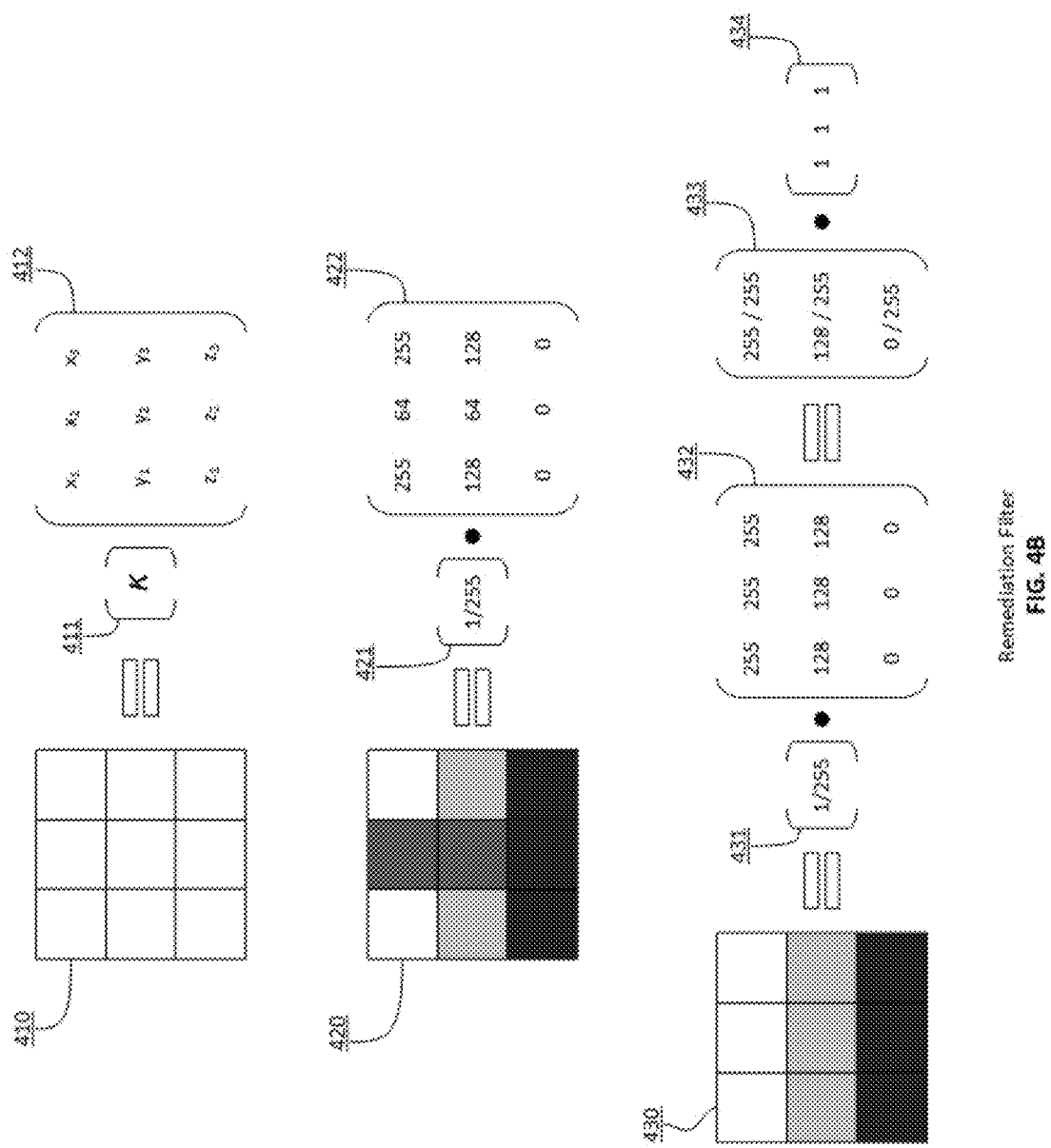
FIG. 4B illustrates the composition of a remediation filter.

FIG. 4B illustrates the composition of a set of remediation filters (items 410, 420, 430), including their respective scalar values (items 411, 421, 431) and their respective bit values (items 412, 422, 432). Additionally, an example of a separable two-dimensional filter split into two one-dimensional filters (items 433, 434) is provided to illustrate an instance of a separable convolution.

A remediation filter 410 is a convolution kernel that is applied to a status code image 400. In some embodiments, the remediation filter 410 includes an array of pixel values 412 and a scalar 411. The remediation process includes convolving the remediation filter across the generated status code image 400. To properly convolve the status code image 400, the remediation filter 410 is set to the same image format as the status code image 400. In some embodiments, the image format also determines the scalar 411 applied to pixel values 412 of the remediation filter 410.

In some embodiments, the scalar 421 of the remediation filter 420 is the reciprocal of the maximum bit value for the status code image 400. For instance, the maximum bit value of a non-signed 8-bit image is 255, thus the scalar 421 is equivalent to "1/255". The values of the remediation filter 422 are relative to respective pixel values. In some embodiments, a remediation filter 430 can include a scalar 431 and pixel values 432 that can be reduced to two one-dimensional pixel arrays (items 433 and 434) for enabling the remediation server to perform the separable convolution during the remediation process. Separable convolution is typically more efficient than traditional convolution, as it requires smaller computations, which in turn can reduce the downtime of service by reducing the time of the remediation process.

In some embodiments, by utilizing a scalar 411 equivalent to the maximum bit value of the status code image 400 and remediation filter 410, the error resolution CNN 120 can omit applying "weight" values in the generation of the initial feature maps (introduces as set 605 in FIG. 6) during the remediation process. The reciprocal maximum bit value of the scalar 421 can create a feature map with values array values between 0 and 1, when all convolved values are averaged by both the pixel size of the remediation filter 420 and the maximum bit value (e.g., the convolved result is divided by the pixel size of the remediation filter multiplied by the maximum bit value). Alternatively, to achieve the same result, the scalar 411 of a remediation filter 410 can be one over the squared maximum bit length. Such an implementation is advantageous in that it reduces numerous calculations in the process; traditionally one unique "weight" value determined and multiplied for each input pixel value. Additionally, when utilizing non-signed image formats (e.g., non-negative bits), the error resolution can also omit normalizing (also known as "rectifying") generated feature maps because non-signed image formats may not create a feature map with negative values.

Remediation Process

Figure 5:
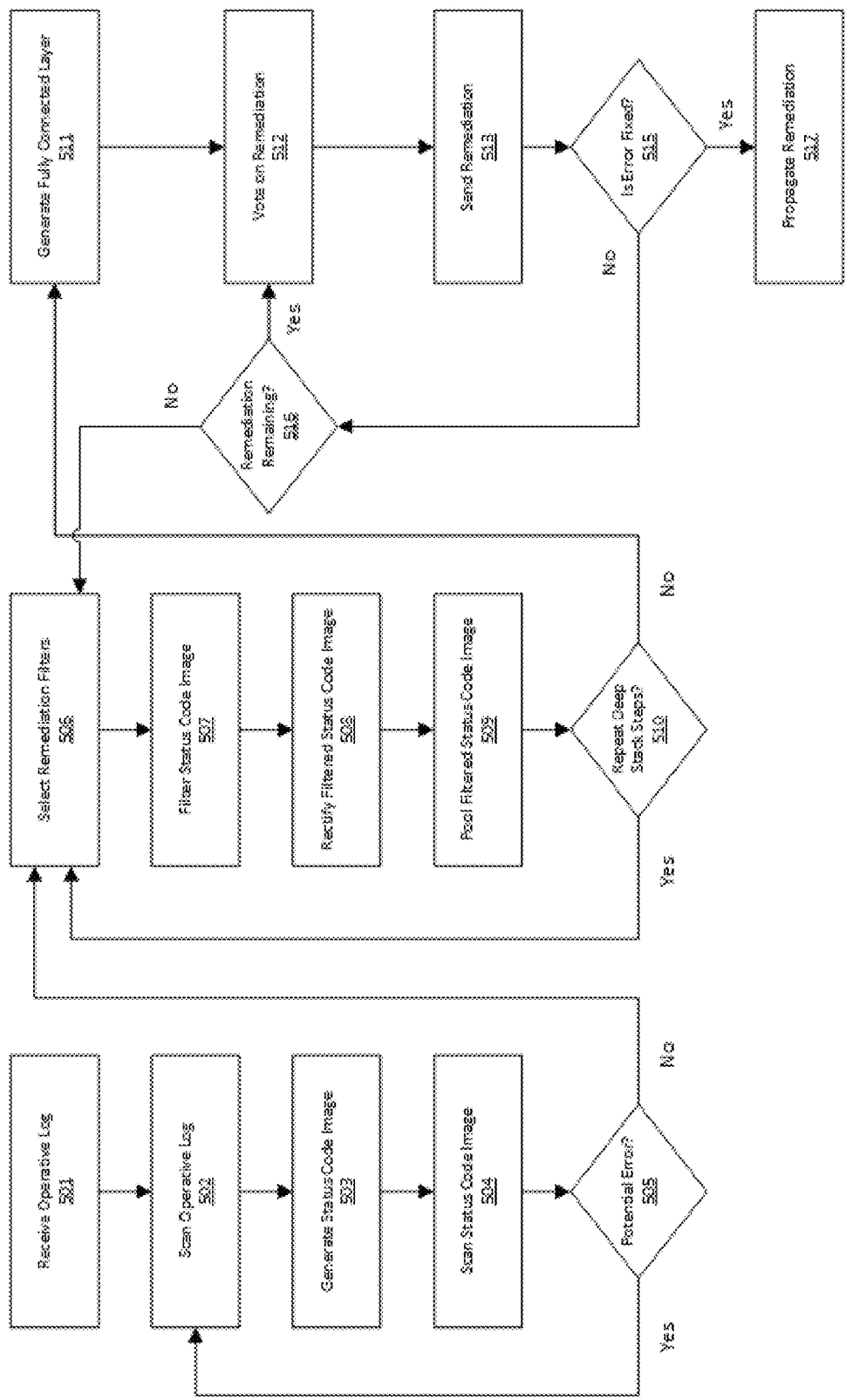
FIG. 5 illustrates the remediation process occurring within the remediation server.

FIG. 5 illustrates the remediation process of the remediation server 100. FIG. 5 includes one embodiment of operative steps (items 501, 502, 503, 506, 507, 508, 509, 511, 512, 523, 517) and conditional checks (items 505, 510, 515, 516) performed by the remediation server 100.

In some aspects, the remediation server 100 receives an operative log 501 from one or more services 10. The remediation server can be configured to scan the operative log 502 and identify HTTP status codes. From the identified HTTP status codes, the remediation server 100 can generate a status code image 503. The remediation server 100 can then determine if there is a potential error at condition 505. In some embodiments, if an error is not likely to occur, the remediation server 100 can receive an updated operative log containing new HTTP status codes by reforming step 501. In some embodiments, reperforming step 501 will provide the remediation server 100 with a new operative log, from either the same service or a different service.

In some aspects, if the remediation server 100 determines a potential error at condition 505, it can select an appropriate remediation filter 506 and filter a status code image 507. If applicable, such as with the case of utilizing signed image format for a status code image, the remediation server 100 may also rectify a filtered status code image 508. Rectifying the status code image 508 is a step that makes all negative values in a filtered status code image (also known as a feature map) equivalent to zero. In some embodiments, using a non-signed image format for the status code image can result in the generation of feature map without negative values. When a filtered status code image contains no negative values, the remediation server 100 can omit rectifying the status code image 508 and continue to pool the filtered status code image 509.

At condition 510, the remediation server 100 can determine if the current feature map is sufficient for generating a fully connected layer 511. If insufficient at 510, the remediation server repeats the deep stack steps (items 5-6, 507, 508, 509) on the current feature map.

In some embodiments, at condition 510 the current feature map is sufficient for generating a fully connected layer 511. A fully connected layer is a one dimension array of the pixel, and their respective values, of a feature map. The remediation server can utilize the fully connected layer to vote on a remediation 512. At this point, the remediation server can send the remediation 513 to the service. If the service error is fixed 515, the remediation server can propagate the remediation 517 and the selected remediation filters to improve the determining logic of the remediation server 100.

In some embodiments, if the remediation is unsuccessful at condition 515, the remediation server can check if a remediation is remaining 516 in the set of voted remediations. If remediations remain 516, the remediation severs 100 can select the next most appropriate remediation from the voted remediations. If no voted remediations remain at step 516, the remediation server 100 can re-filter the status code image by reperforming the deep stack steps, starting at step 506 to select new remediation filters.

Figure 6A:
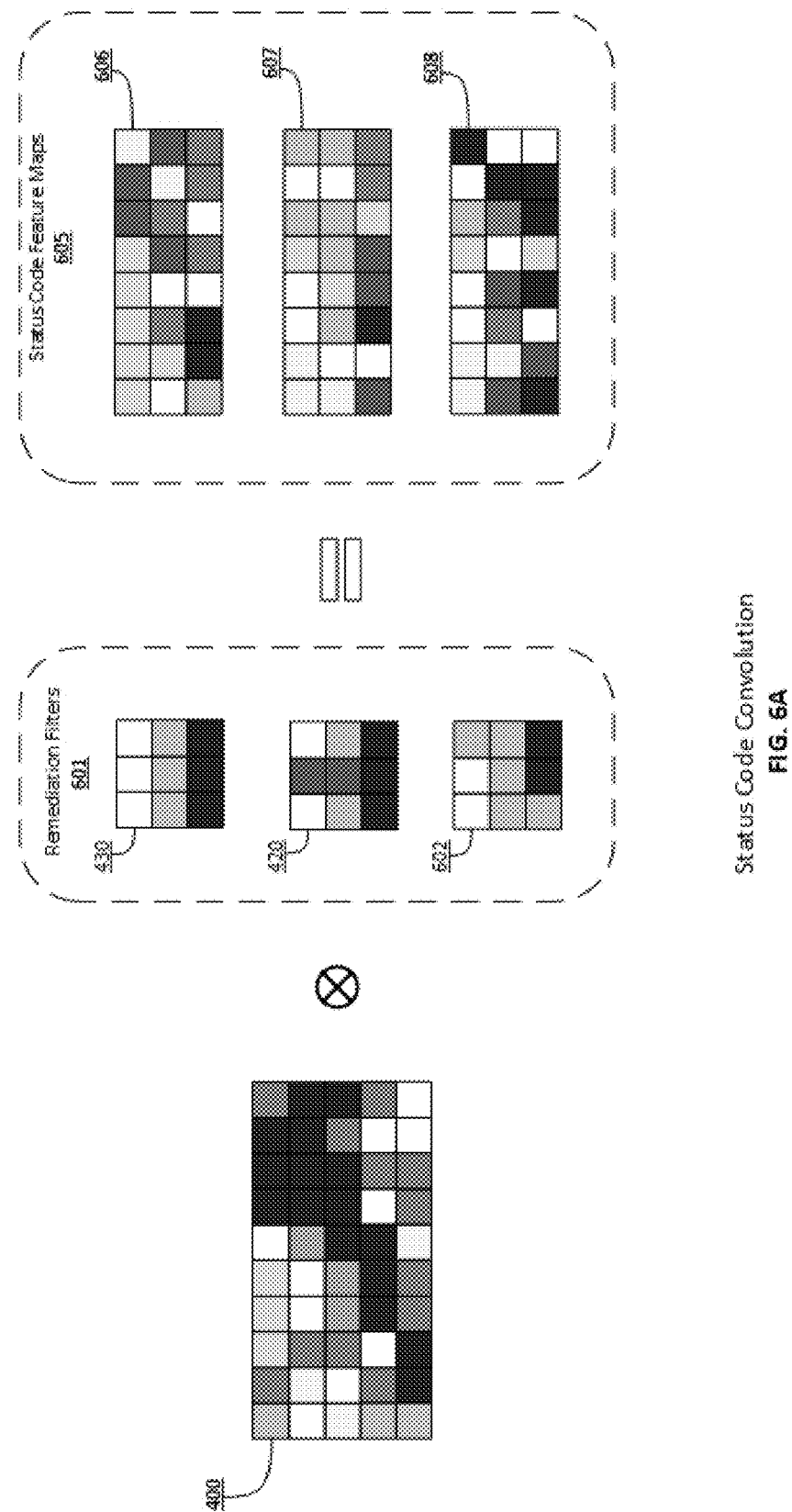
FIG. 6A illustrates status code image convolution occurring within an error resolution convolutional neural network.

FIG. 6A illustrates the filtering of a generated status code image 400, including a set of remediation filters 601 and status code feature maps 605. The generated status code image 400 is convolved with a set of determined remediation filters 601. In some embodiments, each remediation filter (items 430, 420, 602) corresponds to a unique remediation instruction set for remediating a service failure. The convolution of the generated status code image 400 with the set of remediation filters 605 creates a set of respective status code feature maps 605. The set of feature maps 605 contains feature maps 606, 607, and 608 by way of example.

Figure 6B:
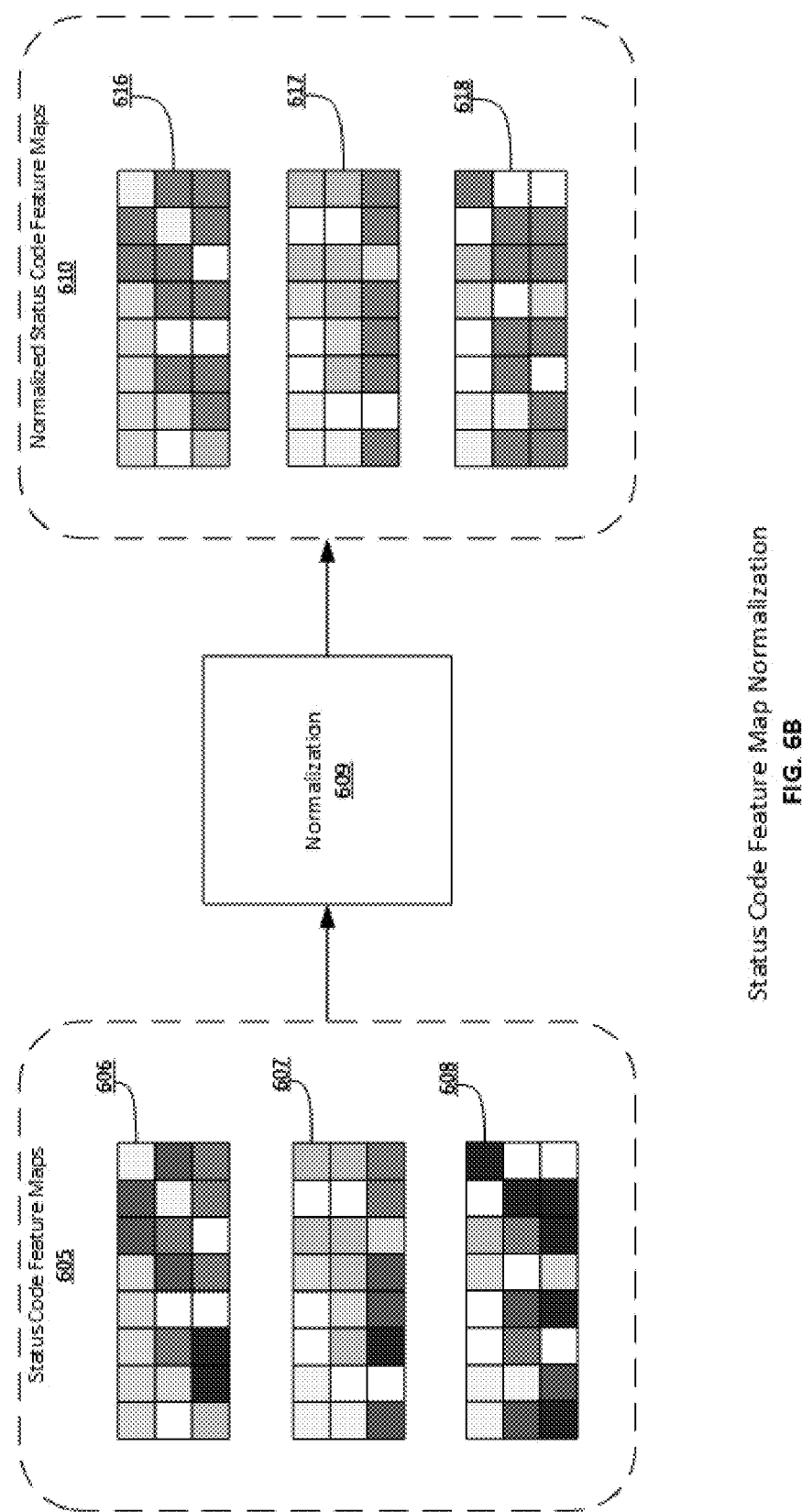
FIG. 6B illustrates a feature map normalization occurring within an error resolution convolutional neural network.

FIG. 6B illustrates feature map normalization, including a normalization module 609 and set status code feature maps 605 and normalized status code feature maps 610. In some aspects, the generated status code image 400 is of a signed bit image format which make it imperative to normalize the generated status code feature maps 605. When required, the status code feature maps can be processed by normalizing logic in normalization module 609 of the remediation server 100 to transform negative values to zero. In some embodiments, the resulting set of normalized status code feature maps 610 can have dark pixels in the image converted to a "medium gray", since it is equivalent to a zero value. For instance, the normalized feature maps 616, 617, and 618 do not contain any black or dark grey colors.

Figure 6C:
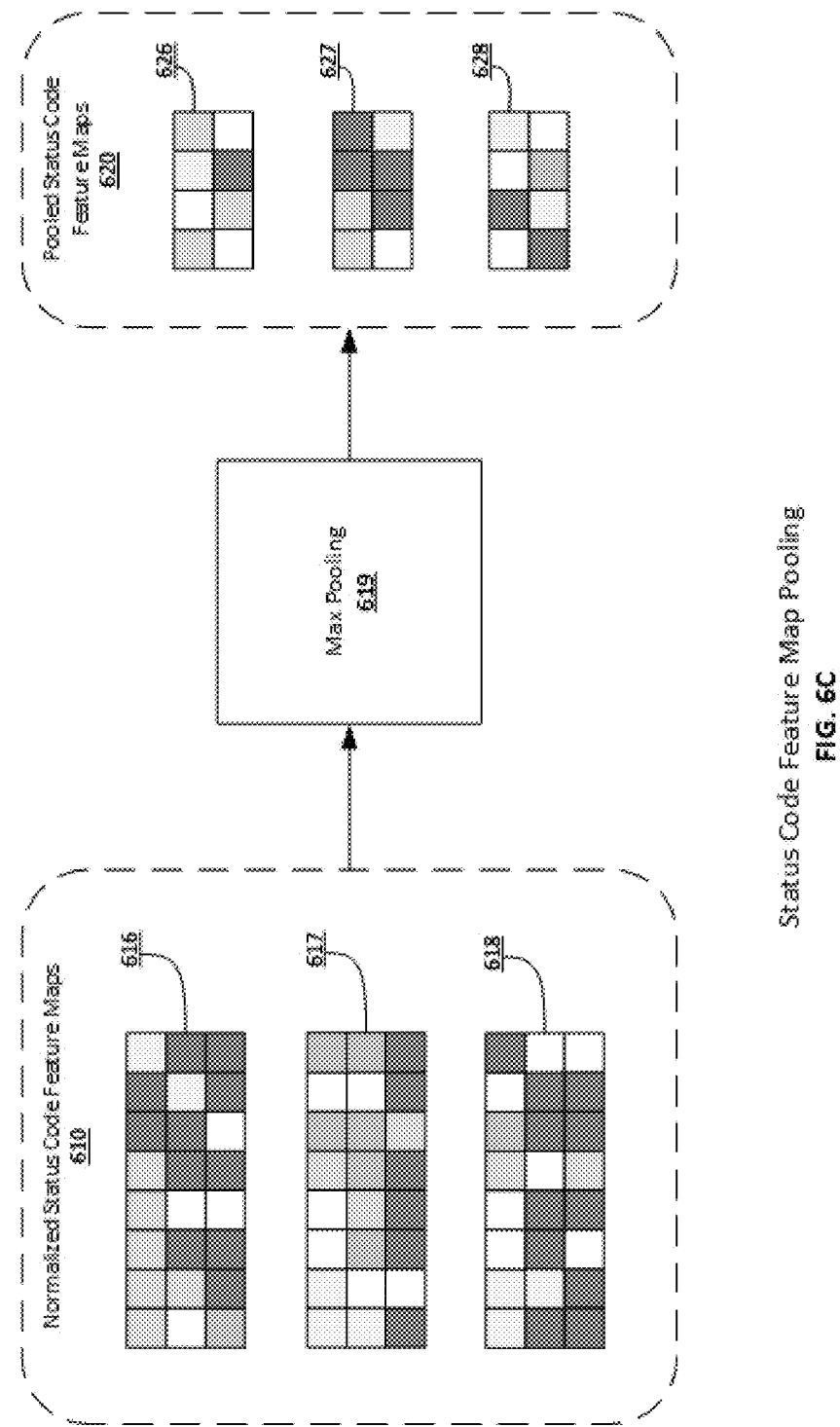
FIG. 6C illustrates a feature map pooling occurring within an error resolution convolutional neural network.

FIG. 6C illustrates pooling of feature maps, including a max pooling module 619 and a set of normalized status code feature maps 620 and pooled status code feature maps 620. In some embodiments, normalized status code features maps 610 can be pooled by the remediation server 100 using a max pooling module 619. The max pooling module 619 can transpose a window, of a determined pixel size, over the normalized status code feature maps 610. In some embodiments, the window sized utilized by the max pooling module is 2×2, thus, when striding over a 3×8 feature maps (items 616, 617, 618) the resulting pooled feature maps 620 is of a size of 2×4 (items 626, 627, 628).

Figure 6D:
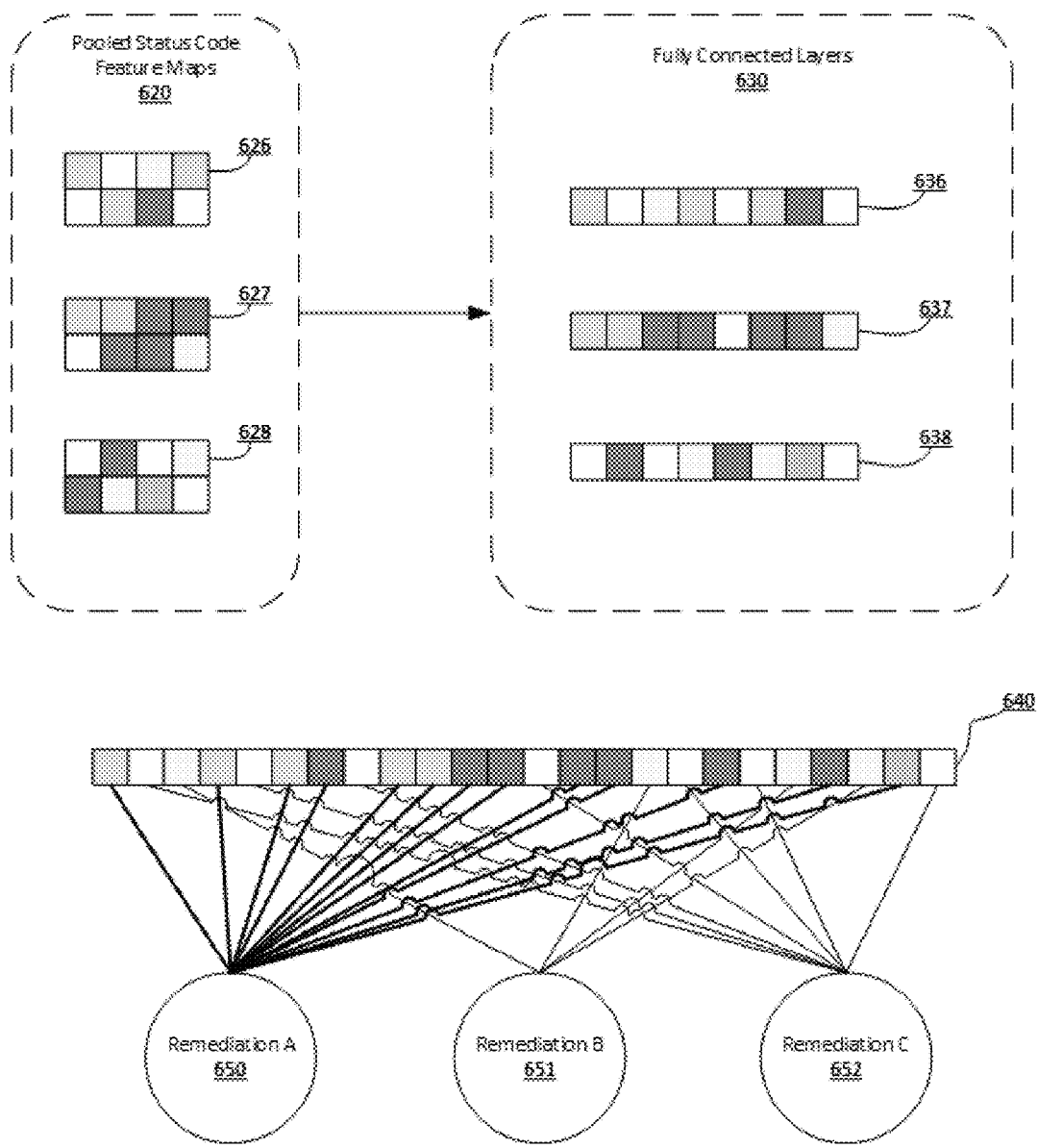
FIG. 6D illustrates a fully connected layer of a pooled feature map utilized to select a remediation within an error resolution convolutional neural network.

FIG. 6D illustrates a fully connected layer, including a set of pooled status code feature maps 620 and their respective fully connected layers 630. In addition, it illustrates concatenated fully connected layers 640 and it's respective remediations (items 650, 651, 652).

In some aspects, the set of pooled status code feature maps 620 are utilized to generate a set fully connected layers 630. By realigning the pooled status code feature maps (items 626, 627, 628) into a single dimensional pixel array, respective fully connected layers (items 636, 637, 638) are created. In some embodiments, the remediation server 100 can then concatenate the set of fully connected layers 630 to create a final fully connected layer 640. The final fully connected layer 640 is then used to vote on a remediation, where each element in the fully connected layer 640 votes toward a single remediation out of a set of remediations. Remediation A (650), B (651) and C (652) correspond to the selected set of remediation filters 601 in the initial filtering process of the generated status code image 400.

By way of example, Remediation A 550 achieves the highest vote count from the fully connected layer 640 and is sent as a remediation to a service. In some embodiments, the votes from the fully connected layer correspond to the value of each element (e.g., pixel color or bit value). When a remediation fails, the second most voted remediation is sent to a service. For example, remediation C 652 is the next most voted remediation and would be sent as secondary remediation attempt upon failure of the first remediation attempt. Similarly, remediation B 651 is the third most voted remediation and would be sent as third remediation attempt upon failure of the second remediation.

Computing Device

Figure 7:
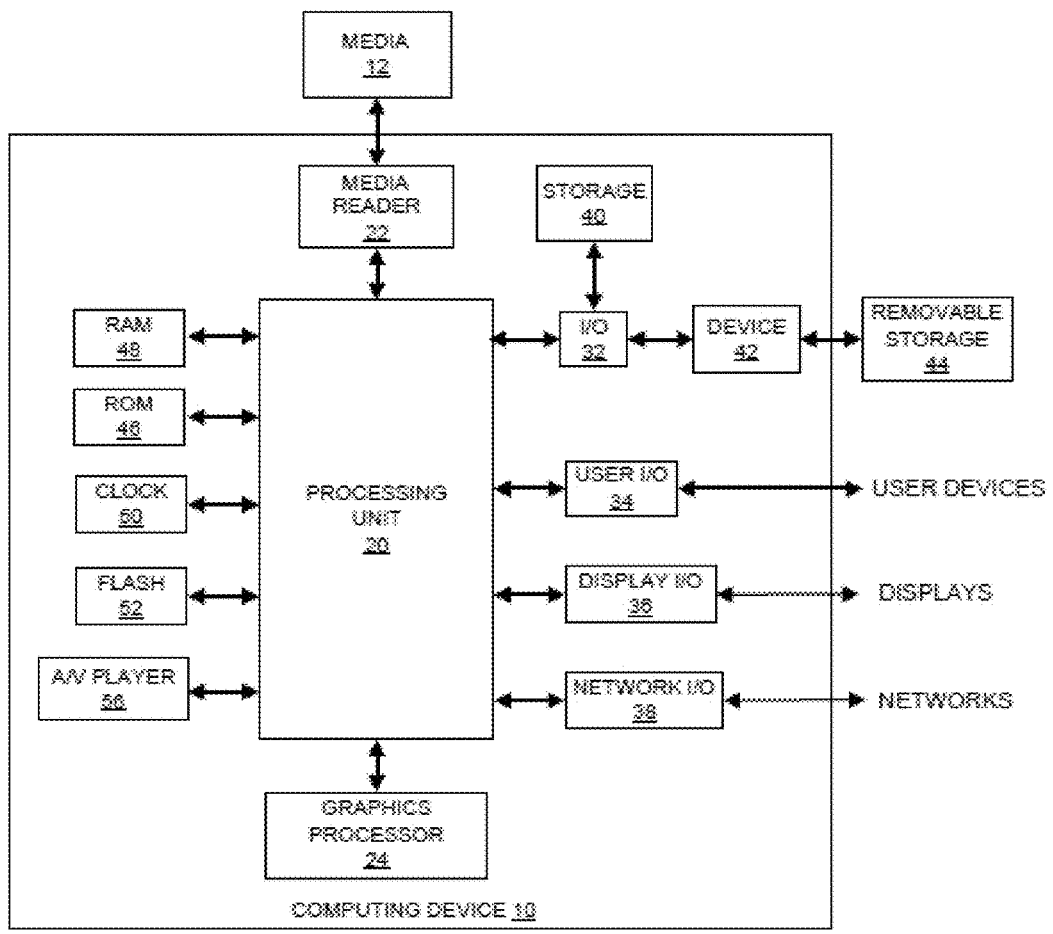
FIG. 7 illustrates an embodiment of computing device according to the present disclosure.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and external components. A media reader 22 is included that communicates with media 12. The media reader 22 may be an optical disc reader capable of reading optical discs, such as CD-ROM or DVDs, or any other type of reader that can receive and read data from media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as keyboards or game controllers. In some embodiments, the user I/O can include a touchscreen. The touchscreen can be capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the present disclosure should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "paring," "comparing," "identifying," "resolving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.). The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A computer-implemented method as implemented by a hardware processor of a remediation server comprising specific computer executable code for remediating a service failure, the method comprising:
receiving an operative log of a service that comprises operative status codes indicative of operative performance of the service;
scanning the operative log as an image for the operative status codes;
identifying a potential service failure of the service based at least in part on the scanned operative status codes of the operative log;
generating a status code image that is indicative of the operative status codes occurring in the service, wherein pixel bit values of the status code image indicate at least levels of occurrences of the operative status codes, and wherein the status code image is optimized for processing by a convolution neural network;

filtering, by way of the convolution neural network that uses one or more filtering parameters, the generated status code image, wherein the one or more filtering parameters are uniquely determined for the generated status code image;

determining a remediation for the potential service failure based at least in part on the filtered status code image that prioritizes an intrusivity of the determined remediation;

sending the determined remediation to the service to remediate the potential service failure; and propagating the one or more filtering parameters and the determined remediation for the generated status code image to the remediation server.

2. The method of claim 1, wherein the operative log of the service is a text file containing the operative status codes in fixed locations, and wherein the operative status codes are conventional hypertext transfer protocol status codes.

3. The method of claim 2, wherein the remediation server is configured with the fixed locations of the operative status codes within the operative log to enable the remediation server to omit scanning of a remainder of the operative log.

4. The method of claim 3, wherein enabling the remediation server to omit scanning of the remainder of the operative log contributes to a reduction of time taken to remediate the service.

5. The method of claim 3, wherein the remediation server is further configured to scan the remainder of the operative log for additional operative metrics of the service.

6. The method of claim 2, wherein the scanning of the operative log as the image is performed character by character using character text filters, and wherein the character text filters comprise a pixel size equivalent to a scanned status code character, such that the remediation server performs a one-to-one pixel comparison for identifying the potential service failure.

7. The method of claim 1, wherein a current service failure is further identified when scanning the operative log.

8. The method of claim 1, wherein the convolutional neural network utilizes remediation filters to filter the generated status code image, and wherein the remediation filters are image based convolution kernels with a pixel bit value equal to that of the generated status code image.

9. The method of claim 8, wherein the remediation filters include a scalar value equivalent to a reciprocal value of a maximum bit value of the generated status code, and wherein inclusion of the scalar value in the remediation filters enables the convolution neural network to omit applying weights to inputs of the convolution neural network.

10. The method of claim 9, wherein enabling the convolution neural network to omit applying the weights to the inputs of the convolution neural network contributes to a reduction of time taken to remediate the service.

11. A remediation server system comprising;

one or more processors; and a memory comprising instructions stored thereon that, when executed by the one or more processors, cause the one or more processors to:

receive an operative log of a service that comprises operative status codes indicative of operative performance of the service;

scan the operative log for the operative status codes;

identify a potential service failure of the service based at least in part on the scanned operative status codes of the operative log;

generate a status code image that is indicative of the operative status codes occurring in the service, wherein pixel bit values of the status code image indicate at least levels of occurrences of the operative status codes, and wherein the status code image is optimized for processing by a convolution neural network;

filter, by way of the convolution neural network that uses one or more filtering parameters, the generated status code image, wherein the one or more filtering parameters are uniquely determined for the generated status code image;

determine a remediation for the potential service failure based at least in part on the filtered status code image that prioritizes an intrusivity of the determined remediation;

send the remediation to the service to remediate the potential service failure; and propagate the one or more filtering parameters and the determined remediation for the generated status code image to the remediation server.

12. The system of claim 11, wherein the operative log of the service is a text file containing the operative service codes in fixed locations and wherein the operative status codes are conventional hypertext transfer protocol status codes.

13. The system of claim 12, wherein the remediation server is configured with the fixed locations of the operative status codes within the operative log to enable the remediation server to omit scanning of a remainder of the operative log.

14. The system of claim 13, wherein the remediation server is further configured to scan the remainder of the operative log for additional operative metrics of the service.

15. The system of claim 13, wherein enabling the remediation server to omit the scanning of the remainder of the operative log contributes to a reduction of time taken to remediate the service.

16. The system of claim 12, wherein the scan of the operative log is performed character by character using character text filters, and wherein the character text filters comprise a pixel size equivalent to a scanned status code character, such that the remediation server performs a one-to-one pixel comparison for identifying the potential service failure.

17. The system of claim 11, wherein a current service failure is further identified when scanning the operative log.

18. The system of claim 11, wherein the convolutional neural network utilizes remediation filters to filter the generated status code image, and wherein the remediation filters are image based convolution kernels with a pixel bit value equal to that of the generated status code image.

19. The system of claim 18, wherein the remediation filters include a scalar value equivalent to a reciprocal value of a maximum bit value of the generated status code, and wherein inclusion of the scalar value in the remediation filters enables the convolution neural network to omit applying weights to inputs of the convolution neural network.

20. The system of claim 19, wherein enabling the convolution neural network to omit applying the weights to the inputs of the convolution neural network contributes to a reduction of time taken to remediate the service.

* * * * *